United States Patent [19]

Martin et al.

[11] Patent Number: 5,769,374
[45] Date of Patent: Jun. 23, 1998

[54] APPARATUS FOR MOUNTING A COMPUTER PERIPHERAL DEVICE AT SELECTIVELY VARIABLE LOCATIONS ON A DISLAY MONITOR

[75] Inventors: Randall W. Martin, The Woodlands; Mark S. Kimbrough, Austin; Dennis J. Wasserman, Austin; Julie Heard, Austin; Kit R. Morris, Austin, all of Tex.

[73] Assignee: Compaq Computer Corporation, Houston, Tex.

[21] Appl. No.: 649,220

[22] Filed: May 17, 1996

[51] Int. Cl.$^6$ .................................................. A47G 1/16
[52] U.S. Cl. .................................. 248/221.11; 248/442.2; 248/918
[58] Field of Search ................................ 248/918, 442.2; 312/7.2, 223.2

[56] References Cited

U.S. PATENT DOCUMENTS

| | | | |
|---|---|---|---|
| 4,693,443 | 9/1987 | Drain | 248/918 X |
| 4,960,257 | 10/1990 | Waters | 248/918 X |
| 5,082,235 | 1/1992 | Crowther et al. | 248/442.2 X |
| 5,122,928 | 6/1992 | Lo | 312/7.2 X |
| 5,292,099 | 3/1994 | Isham et al. | 248/442.2 |
| 5,619,395 | 4/1997 | McBride | 248/918 X |
| 5,627,606 | 5/1997 | Pember et al. | 312/7.2 X |
| 5,683,070 | 11/1997 | Seed | 248/442.2 |

*Primary Examiner*—Ramon O. Ramirez
*Assistant Examiner*—Long Dinh Phan
*Attorney, Agent, or Firm*—Konneker & Smith, P.C.

[57] ABSTRACT

The screen of a computer monitor is surrounded by a generally rectangular monitor housing frame portion having an outer peripheral side edge disposed generally perpendicularly to the screen, and a rear side edge area disposed generally parallel to the screen. A mounting groove is formed in and extends continuously around the peripheral frame side edge, and a spaced series of mounting holes extend around the length of the rear side edge area. A computer peripheral device has a body portion from which a spline outwardly projects, and a mounting flange portion with a spaced pair of holes formed therein and alignable with a selected pair of the frame mounting holes. The peripheral device may be removably mounted on a selectively variable position on the screen frame portion by inserting the spline into the frame groove and inserting suitable fastening members inwardly through the mounting flange holes and into the frame mounting holes aligned therewith. The peripheral device mounting flange is adjustable to compensate for width variations along the screen frame portion, and auxiliary support pins are provided that may be inserted into vacant screen frame mounting holes to act as wiring supports upon which wiring from the mounted peripheral device may be rested to route the wiring from the peripheral device to a suitable source of power and at the same time at least partially conceal the wiring from view from the front of the monitor.

18 Claims, 3 Drawing Sheets

APPARATUS FOR MOUNTING A COMPUTER PERIPHERAL DEVICE AT SELECTIVELY VARIABLE LOCATIONS ON A DISLAY MONITOR

BACKGROUND OF THE INVENTION

1. Field of the Invention

The present invention relates to electronic apparatus and, in a preferred embodiment thereof, more particularly relates to the mounting of mechanical and electrical computer peripheral devices, such as speakers, video cameras, document holders, microphones and telephones, on a display monitor.

2. Description of Related Art

Multimedia computer systems typically have one or more mechanical and/or electronic peripheral upgrade devices associated therewith, such as speakers, microphones, video cameras, telephones, document holders and the like. Originally, in desktop computer systems these and other types of peripheral devices were simply placed in suitable locations on the desktop work surface separate and apart from the computer and its associated display monitor. However, more recently the computer industry has begun to recognize the possibility of making the display monitor, in effect, a multimedia work "substation" by incorporating therein various peripheral devices.

For example, speakers and video cameras have previously been permanently built into a desktop computer display monitor at fixed locations thereon. Additionally, there have been several prior art proposals to provide for the detachable mounting of speakers on a monitor, but again at only a single, fixed speaker location on a given monitor.

As can readily be seen, the above prior art approaches to mounting peripheral devices on a computer display monitor are undesirable from a flexibility standpoint because of the limited and nonvariable locations made available on the monitor for mounting of peripheral devices. Because of this it would be highly desirable to provide apparatus for mounting one or more peripheral devices on a display monitor of a computer, or other electronic device, at selectively variable locations thereon. It is accordingly an object of the present invention to provide such mounting apparatus.

SUMMARY OF THE INVENTION

In carrying out principles of the present invention, in accordance with a preferred embodiment thereof, electronic apparatus is provided which includes (1) a display monitor, representatively a desktop computer monitor; (2) a peripheral device which may be a mechanical or electrical device that is operatively associateable with the overall electronic apparatus and has first and second mounting portions; and (3) mounting means for removably mounting the peripheral device on selectively variable locations on the monitor.

The display monitor has a display screen, and a housing having a front side and a frame portion extending around the display screen and operatively supporting it on the front side of the housing. The housing frame portion has a front side surface, a rear side surface spaced rearwardly apart from the front side surface, and an outer peripheral side surface extending between the front and rear side surfaces of the frame portion.

The mounting means representatively include first means carried on the frame portion and being removably interlockable with the first portion of the peripheral device in a manner preventing appreciable front-to-rear movement of the device relative to the frame portion; and second means for releasably anchoring the second portion of the peripheral device to the frame portion in a manner preventing appreciable movement of the peripheral device around the periphery of the frame portion of the housing.

Representatively, the first means include a groove formed in and extending around the outer side peripheral surface of the frame portion and configured to slidingly receive the first portion of the peripheral device, representatively an external spline thereon. The peripheral device preferably has an attachment wall carried thereon and defining the aforementioned second peripheral device portion.

The second means include a plurality of holes extending through the attachment wall and alignable with a selectively variable plurality of a spaced series of mounting holes formed in the rear side surface of the frame portion, and a plurality of fastener members, representatively expansion pin assemblies, insertable through the wall portion holes and into the frame mounting holes.

The peripheral device may be easily, quickly and removably mounted on a selectively variable location on the monitor frame portion by simply positioning the peripheral device at the selected location, inserting the peripheral device spline into the monitor frame groove, and then extending the expansion pins through the wall portion holes and into the underlying monitor housing frame portion mounting holes. The interlocked spline and groove prevent appreciable movement of the mounted peripheral device in front-to-rear directions relative to the monitor frame, while the expansion pins prevent appreciable movement of the mounted peripheral device around the periphery of the monitor housing frame.

The electronic apparatus may also include a plurality of support and routing pin members partially insertable into some of the frame mounting holes not occupied by the expansion pin assemblies or other peripheral device-supporting fastener members. When the peripheral device is an electrical device having an elongated electrical cable structure extending outwardly therefrom, outwardly projecting portions of the support and routing pin members define a support structure disposed behind the frame portion and by which the electric cable structure may be restrained in a manner at least partially concealing it from the view of a user positioned in front of the display monitor screen.

DETAILED DESCRIPTION

Figure 1:
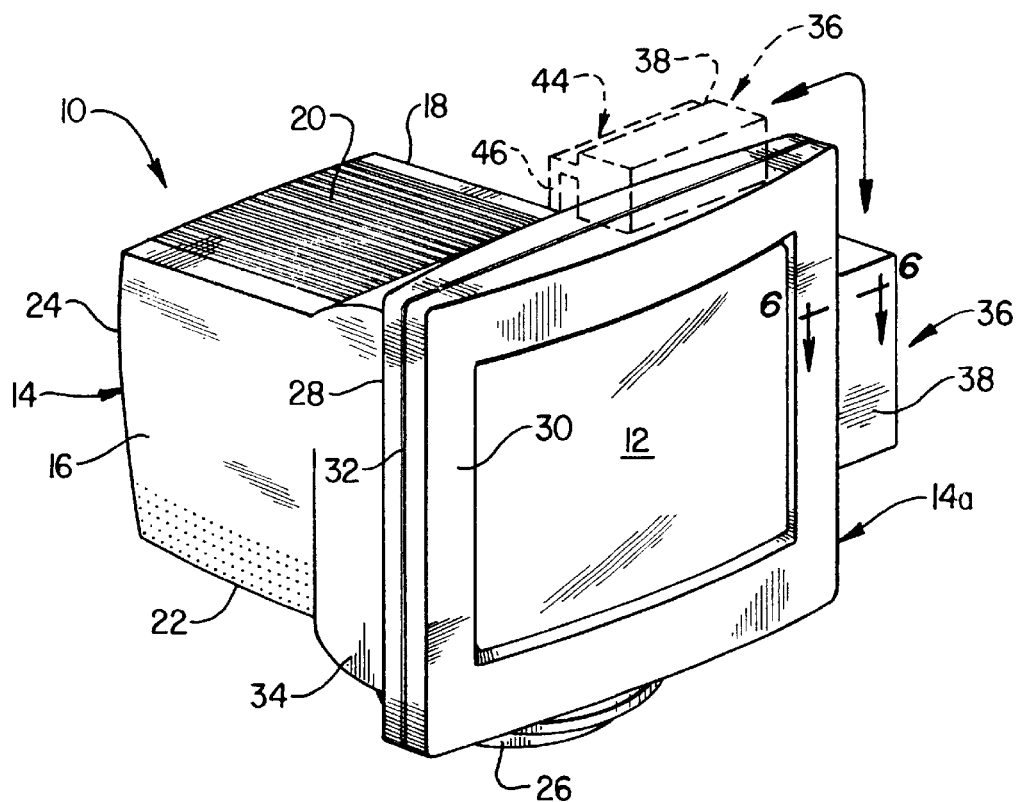
FIG. 1 is a perspective view of a computer display monitor embodying principles of the present invention, with a representative, somewhat schematically depicted peripheral device being removably mounted on a selectively variable location on the monitor.
Figure 2:
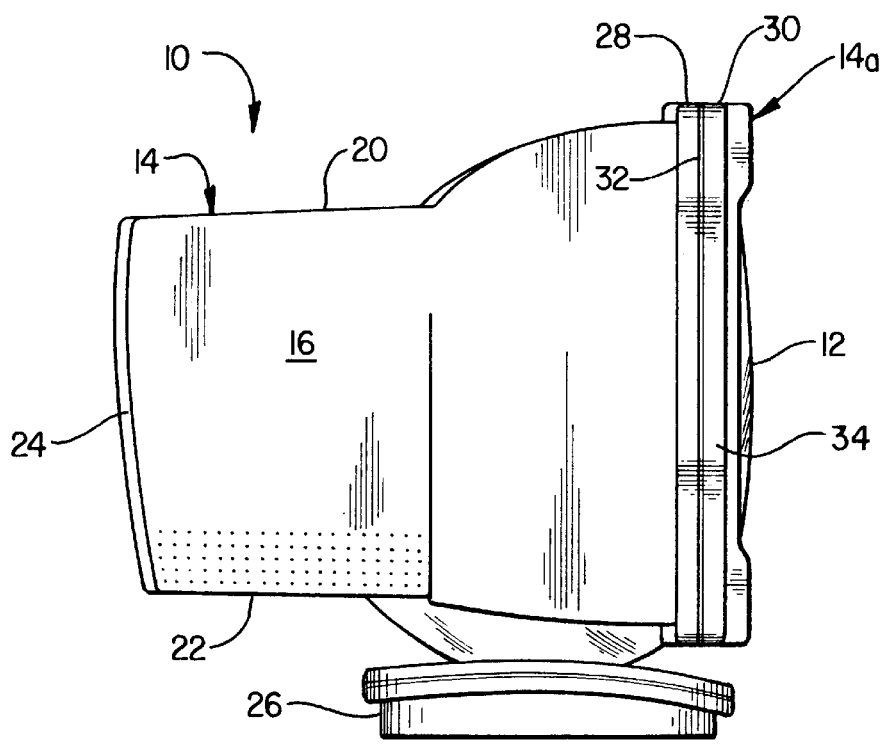
FIG. 2 is an enlarged scale left side elevational view of the display monitor.

Referring initially to FIGS. 1–4, the present invention provides a specially designed electronic device display monitor structure, representatively a desktop computer monitor 10 having a forwardly facing display screen 12, and a molded plastic housing 14 having left and right side walls 16 and 18, top and bottom walls 20 and 22, a rear wall 24, and a suitable depending support pedestal structure 26. While the illustrated display monitor structure is a desktop computer monitor, it could alternatively be another type of electronic device display monitor such as the monitor portion of a portable computer.

Figure 4:
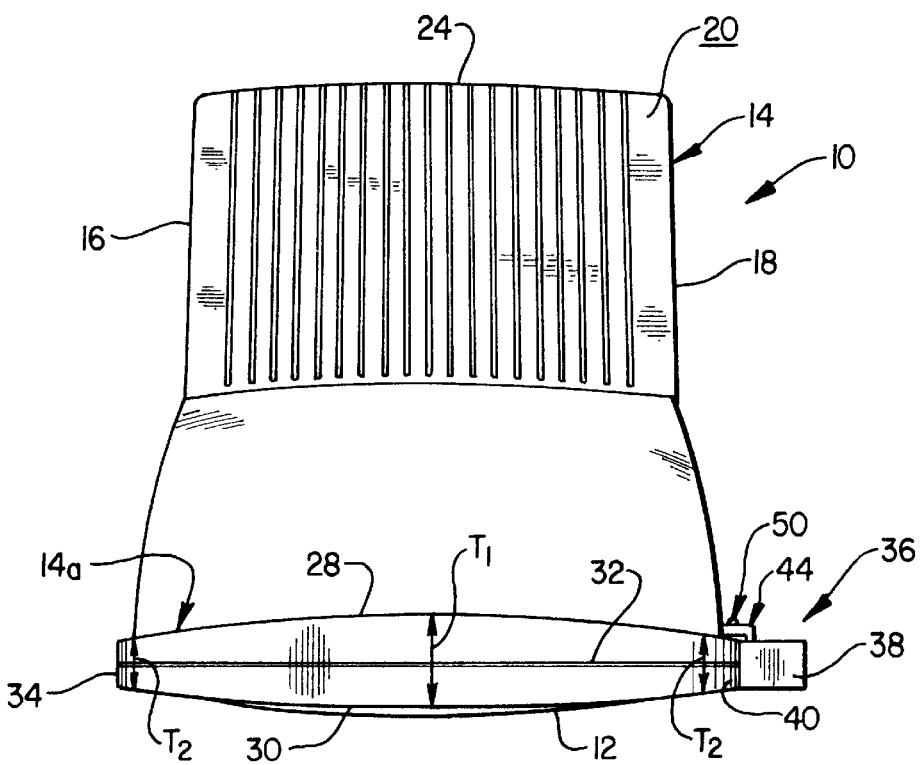
FIG. 4 is an enlarged scale top plan view of the display monitor.

Surrounding the screen 12 at the front side of the monitor 10 is a generally rectangular frame portion 14a of the housing 14. Frame portion 14a includes a rectangular housing section 28, a rectangular front side bezel section 30 positioned forwardly of the housing frame section 28 and aligned therewith, and a mounting groove 32 extending continuously around the external side periphery 34 of the frame portion 14a. As best illustrated in FIG. 4, each of the top and bottom side portions of the external frame periphery 34 has a central horizontal thickness $T_1$ appreciably than the horizontal thickness $T_2$ at its opposite ends.

Figure 3:
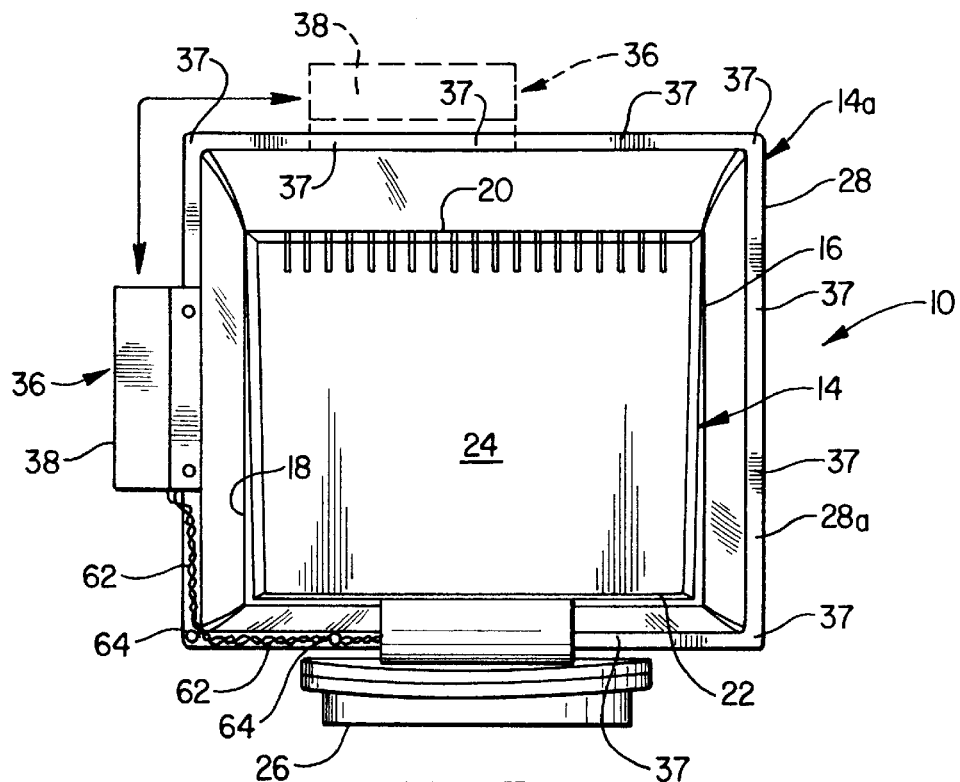
FIG. 3 is an enlarged scale rear side elevational view of the display monitor.

The rectangular external frame side groove 32 forms a portion of specially designed cooperatively interengageable mounting means disposed on the monitor 10 and a schematically depicted computer peripheral device 36 (see FIGS. 1, 3 and 4) and permitting the peripheral device 36 to be removably mounted on a selectively variable location on the outer side periphery of the frame portion 14a. For example, such mounting means may be used to mount the peripheral device 36 in its solid line orientation on a vertical side of the frame portion 14a, or in its dotted line orientation on the top or bottom side of the frame portion 14a (see FIGS. 1 and 3). As best illustrated in FIG. 3, the mounting means also include a series of small circular mounting holes 37 molded into and spaced at regular intervals around the rear side 28a of the screen frame section 28.

Figure 5:
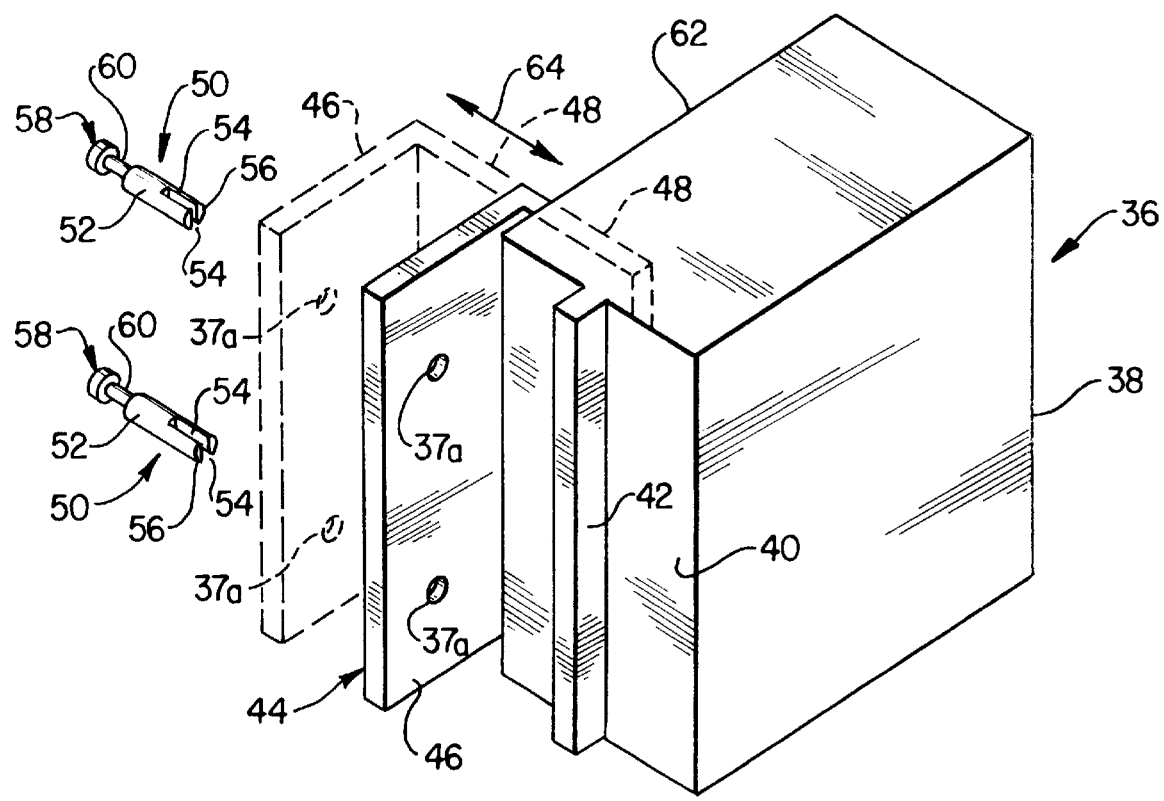
FIG. 5 is an enlarged scale, partially exploded and phantomed perspective view of the peripheral device removed from the display monitor.

With additional reference now to FIG. 5, the peripheral device 36 may be one of a variety of mechanical or electronic devices that may be used in conjunction with the overall computer system of which the monitor 10 is a part, including, but not limited to, a speaker, a microphone, a video camera, a telephone, a document holder, a support structure (such as a telephone cradle) for another device, and the like. As schematically shown in FIG. 5, the peripheral device 36 representatively has a generally rectangular body 38 with an exterior side wall 40.

In addition to the monitor frame groove 32 and the frame mounting holes 37, the aforementioned mounting means also include an outwardly projecting spline 42 formed on the body wall 40; an angled support bracket 44 having perpendicular leg portions 46 and 48; a vertically spaced pair of circular holes 37a formed in the leg portion 46 and alignable with a selected pair of the frame mounting holes 37; and a pair of fastening structures—representatively a pair of conventional plastic expansion pin structures 50 such as the SR-3080 expansion pin assemblies commercially available from RICHCO Plastics Company, 5825 N. Tripp Ave., Chicago, Ill. 60646.

Each plastic expansion pin structure 50 includes a hollow tubular body portion 52 with a diametrically opposite pair of axial slots 54 extending inwardly from its rear end 56, and an interior surface (not shown) that tapers rearwardly and radially inwardly adjacent the split rear body end portion, and an expansion pin 58 having a cylindrical body 60 slidably and coaxially received in the interior of the tubular body portion 52. In a conventional manner, by pushing the pin body 60 rearwardly through the interior of the outer body portion 52 (i.e., rightwardly as viewed in FIG. 5), the rear end of the pin body expands the axially split rear end portion of the outer body portion 52 to thereby releasably lock it within a complementary opening in which it is received (as later described herein). By simply pulling the inserted pin body 60 forwardly out of the outer body portion 52 (i.e., to the left as viewed in FIG. 5), the axially split rear end of the outer body portion 52 is permitted to radially retract and thereby allow removal of the overall pin structure 50 from the opening in which it was inserted.

Figure 6:
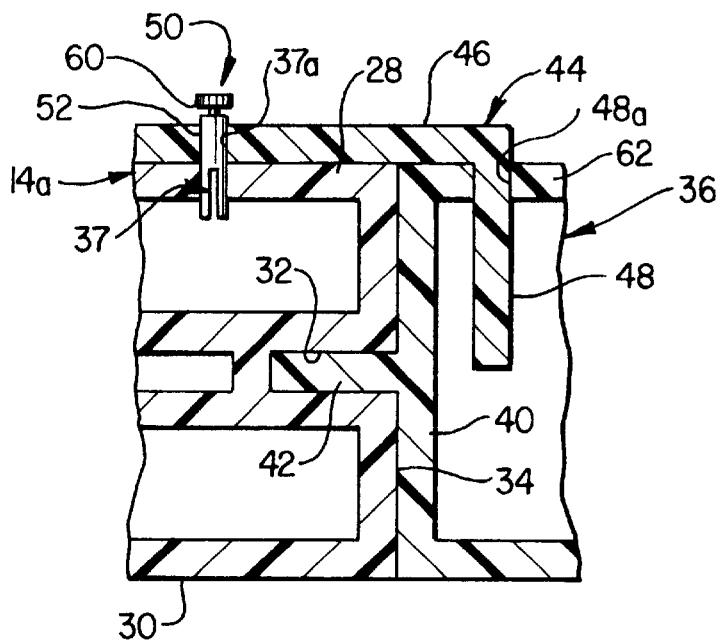
FIG. 6 is an enlarged scale simplified cross-sectional view through portions of the display monitor and peripheral device taken generally along line 6—6 of FIG. 1.

With reference now to FIGS. 5 and 6, the peripheral device body spline 42 is slidably and removably insertable into the monitor screen frame groove 32, and the bracket leg portion 48 is slidably retained in a corresponding slot 48a (see FIG. 6) in a rear wall 62 of the peripheral device body 38 in a manner permitting the bracket 44 to be adjusted between its solid and dotted line positions in FIG. 5 (as indicated by the double-ended arrow 64 in FIG. 5) to thereby permit the distance between the bracket leg portion 46 and the rear body wall 62 to be selectively adjusted.

To removably attach the peripheral device 36 to a selectively variable location around the exterior of the monitor frame portion 14a (for example, on the side or top of the frame portion 14a as illustrated in FIGS. 1 and 3), the spline portion 42 of the device 36 is slidably inserted into the frame groove 32 (see FIG. 6), and the support bracket leg portion 46 forwardly bearing against the rear side 28a of the housing frame section 28 with the bracket leg holes 37a aligned with a corresponding pair of housing frame holes 37 (see FIGS. 6 and 7).

As will be readily appreciated, the ability to outwardly and inwardly adjust the angled support bracket 44, as illustrated in FIG. 5, facilitates the adjustment of the mounting portion of the peripheral device 36 to accommodate the variation in the frame thickness T (as illustrated in FIG. 4) which representatively ranges from $T_1$ to $T_2$.

With the bracket leg portion 46 positioned as described above against the rear side 28a of the monitor frame section 28, the expansion pin body portions 52 are pushed inwardly through the aligned hole pairs 37a,37. Next, the pins 60 are pushed inwardly into the inserted body portions 52 to expand their axially split inner ends 56 and releasably lock the inserted expansion pin structures 50 in place and thereby correspondingly lock the mounted peripheral device 36 in place on its selected position around the monitor frame structure 14a. To remove the mounted peripheral device 36, the pins 60 are simply pulled outwardly to permit the release of the previously expanded pin bodies 52, and the spline 42 is removed from the frame groove 32.

Referring now to FIG. 3, the illustrated peripheral device 36 is representatively an electronic device, such as a video camera, with an associated electrical cable 62 operatively connected at one end thereto and adapted to be connected at its other end to an electrical power source (not illustrated) behind the monitor 10. To conveniently conceal the cable 62 from the view of a user located in front of the monitor, and generally tidy up the installation of the peripheral device 36 at its selectively variable location on the monitor 10, small plastic cable routing and support pins 64 are simply inserted into unused ones of the frame holes 37 (as illustrated in FIG. 3), and the cable 62 is run as shown along side surfaces of outwardly projecting portions of the pins 64 at the rear side of the frame structure 14a. As will be readily appreciated by those of skill in this particular art, the pins 64 may be used in this cable concealment/support role regardless of where around the periphery of the frame structure 14a the device 36 is removably mounted.

The foregoing detailed description is to be clearly understood as being given by way of illustration and example only, the spirit and scope of the present invention being limited solely by the appended claims.

What is claimed is:

1. An electronic apparatus display monitor comprising:

a display screen;

a housing having a front side and a frame portion extending around said display screen and operatively supporting it on said front side of said housing; and mounting means disposed on said frame portion and being cooperatively associatable with a peripheral device in a manner permitting the device to be removably mounted on said frame portion at selectively variable locations around its periphery, said mounting means including:

first means carried by said frame portion and being removably and slidably interlockable with a portion of the device in a manner permitting the device to be slidably moved to a selectively variable location along the periphery of said frame portion, and second means carried by said frame portion and being useable to removably lock the device to the frame portion in a manner precluding sliding movement of the device around the periphery of said frame portion.

2. The electronic apparatus display monitor of claim 1 wherein:

said frame portion has a front side surface, a rear side surface spaced rearwardly apart from said front side surface, and an outer peripheral side surface extending between said front and rear side surfaces of said frame portion, and said first means include a groove formed in and extending around said outer peripheral side surface of said frame portion.

3. The electronic apparatus display monitor of claim 2 wherein:

said second means include a spaced series of holes formed in said frame portion and configured to removably receive fastening members.

4. The electronic apparatus display monitor of claim 1 wherein:

said second means include a spaced series of holes formed in said frame portion and configured to removably receive fastening members.

5. The electronic apparatus display monitor of claim 1 wherein:

said first means are operative, when interlocked with said portion of the device, to essentially preclude movement of the device in front-to-rear directions relative to said frame p portion of said housing.

6. The electronic apparatus display monitor of claim 1 wherein:

said display monitor is a computer display monitor.

7. The electronic apparatus display monitor of claim 6 wherein:

said computer display monitor is a desktop computer display monitor.

8. Electronic apparatus comprising:

a display monitor having a display screen, and a housing having a front side and a frame portion extending around said display screen and operatively supporting it on said front side of said housing;

a peripheral device; and mounting means for removably mounting said peripheral device on said frame portion at selectively variable locations around the periphery of said frame portion, said mounting means including:

first means carried on said frame portion and being removably interlockable with said peripheral device in a manner preventing appreciable front-to-rear movement of said peripheral device relative to said frame portion, but permitting said peripheral device to be moved around the periphery of said frame portion, and second means for releasably anchoring said peripheral device to said frame portion in a manner preventing appreciable movement of said peripheral device around the periphery of said frame portion.

9. The electronic apparatus of claim 8 wherein:

said display monitor is a computer monitor.

10. The electronic apparatus of claim 9 wherein:

said computer monitor is a desktop computer monitor.

11. The electronic apparatus of claim 8 wherein:

said frame portion of said housing has a front side surface, a rear side surface spaced rearwardly apart from said front side surface, and an outer peripheral side surface extending between said front and rear side surfaces of said frame portion, and said first means include a groove formed in and extending around said peripheral side surface and configured to slidingly receive a portion of said peripheral device.

12. The electronic apparatus of claim 11 wherein:

said portion of said peripheral device is an external spline on said peripheral device.

13. The electronic apparatus of claim 8 wherein:

said frame portion of said housing has a front side surface, a rear side surface spaced rearwardly apart from said front side surface, and an outer peripheral side surface extending between said front and rear side surfaces of said frame portion, and said second means include a plurality of mounting holes formed in said frame portion and configured to receive fastening members extended through a portion of said peripheral device.

14. The electronic apparatus of claim 13 wherein:

said portion of said peripheral device is a wall portion thereof and has a plurality of holes extending therethrough and being alignable with a selectively variable plurality of said mounting holes.

15. The electronic apparatus of claim 14 further comprising:

a plurality of fastener members extendable through said plurality of holes in said portion of said peripheral device and removably insertable into a plurality of said mounting holes aligned therewith.

16. The electronic apparatus of claim 15 wherein:

said fasteners are expansion pin structures.

17. The electronic apparatus of claim 14 wherein:

said wall portion is slidingly adjustable relative to the balance of said peripheral device in a manner providing for mounting compensation for thickness variations along the periphery of said frame portion of said housing.

18. The electronic apparatus of claim 13 wherein:

said mounting holes are formed in said rear side surface of said frame portion, said peripheral device is an electronic device having an elongated electric cable structure extending outwardly therefrom, and said electronic apparatus further comprises routing pin members removably and partially insertable into selected ones of said mounting holes in said rear side surface of said frame portion in a manner such that outwardly projecting portions of the partially inserted routing pin members define a support structure disposed behind said frame portion and by which said electric cable structure may be restrained to at least partially conceal it from the view of a user positioned in front of said display screen.

* * * * *